2,868,737
Patented Jan. 13, 1959

United States Patent Office

2,868,737

CATION EXCHANGERS CONTAINING SELENIC ACID GROUPS

Carl Boresch, Leverkusen, Germany, assignor to Farbenfabriken Bayer Aktiengesellschaft, Leverkusen, Germany, a corporation of Germany No Drawing. Application April 5, 1955
Serial No. 499,537

Claims priority, application Germany April 13, 1954

9 Claims. (Cl. 260—2.2)

This invention relates to cation exchangers.

The present invention provides, as new compounds, cross-linked organic polymeric compounds of high molecular weight which contain selenic acid groups. We have found that these componds are highly suitable for use as cation exchangers and that they are characterized by a high degree of selectivity as compared with the cation exchangers which are in general use. Accordingly, the present invention provides a process of cation exchange, wherein a cation-containing liquid is brought into contact with one of these cation-exchangers.

This high selectivity is due to the fact that the selenic acid groups of these cation exchangers are tribasic acid groups which as free acids are capable of decomposing neutral salts, but which in the form of primary salts only decompose salts of weak acids, and in the form of secondary salts are not able to decompose salts, but are converted into tertiary salts only by basic compounds.

These cation exchangers are produced by the action of selenic acid on cross-linked organic compounds of high molecular weight containing aromatic nuclei, which are capable of being sulfonated. Suitable organic compounds are for instance cross-linked phenol-aldehyde resins as they are disclosed in United States Patents 2,191,853 and 2,204,539 of special value are such high molecular cross-linked organic compounds, the aromatic nuclei of which do not contain free hydroxyl groups such as reaction products of alkylene dichlorides with aromatic hydrocarbons as disclosed in copending application Serial No. 286,420, filed May 6, 1952, polymers of aromatic compounds containing several vinyl groups or copolymers of such compounds with aromatic monovinyl compounds as disclosed in United States Patents 2,366,007 and 2,597,438. Accordingly, the present invention also provides a process for the producttion of cation exchangers, which comprises reacting selenic acid with a cross-linked organic polymeric compound of high molecular weight. In this reaction concentrated sulphuric acid, provided that it is not in the form of oleum, can be used as a diluent for the selenic acid without itself having a sulphonating action. The selenic acid group can be introduced under mild conditions by simultaneously using copper selenides or silver selenate.

The following examples further illustrate the invention:

*Example 1*

30 parts by volume of a pearl polymer of styrene and 2.5 percent by weight of divinyl benzene are heated with 80 parts by weight of selenic acid at about 100° C. and maintained at this temperature for 3½ hours. After cooling, the mixture is introduced into a 10% sodium chloride solution, whereupon the resin obtained is separated and washed with 5% hydrochloric acid solution. 46 Parts by volume of a resin are obtained; this resin has a capacity of 0.97 milli-equivalent/ml. of swollen resin or 1.48 milli-equivalents/ml. of unswollen resin.

*Example 2*

30 parts by volume of a pearl polymer of styrene and 2.5 percent by weight of divinyl benzene are heated to about 100° C. in 80 parts by weight of selenic acid and silver selenate, which was obtained from 3 parts by weight of silver nitrate and 6 parts by weight of selenic acid, and the mixture is maintained at this temperature for 45 minutes. The mixture is then kept for 15 hours at 90° C. and, after cooling, introduced into a 10% sodium chloride solution. The resin obtained is separated and washed with 5% hydrochloric acid. 43 parts by volume of a cation exchanger are obtained; this exchanger has a capacity of 1.0 milli-equivalent/ml. of swollen resin or 1.77 milli-equivalents/ml. of unswollen resin.

*Example 3*

10 parts by volume of a pearl polymer of styrene and 2.5 percent by weight of divinyl benzene are swelled in ethylene chloride, air-dried with suction and heated for 1 hour at 100° C. with 26.6 parts by weight of selenic acid, 32.3 parts by weight of sulphuric acid (98%) and silver selenate, which was obtained from 0.5 part by weight of silver nitrate and 1 part by weight of selenic acid. The reaction mixture is then kept for 17 hours at 80° C. After cooling, the reaction product is separated and washed with sulphuric acid (60° Bé.), whereupon it is introduced into a 15% sodium chloride solution, separated, and washed with 5% hydrochloric acid. 21.7 parts by volume of a resin are obtained; this resin has a capacity of 1.38 milli-equivalents/ml. of swollen resin or 3.0 milli-equivalents/ml. of unswollen resin.

*Example 4*

100 cc. of a selenic acid ion exchanger prepared as described in the preceding examples are regenerated with 300 cc. of 6% HCl and washed. The exchanger is thereafter treated with 250 cc. of 2% NaOH and washed with 100 cc. of water. The amount of absorption corresponds to a capacity of 2.5 to 3.0% of CaO per 100 cc. of exchanger as found by the method disclosed by Griessbach in "Beihefte der Zeitschrift des Vereins Deutscher Chemiker," Nr. 31 (1939), page 10.

*Example 5*

100 cc. of a selenic acid exchanger prepared by the process of the present invention are regenerated with 300 cc. of 6% HCl and washed. The exchanger is then treated with a 3% sodium acetate solution until the exchanger is exhausted. A capacity of 1.5–2% of CaO per 100 cc. of exchanger as found by the method of Example 4 was established.

*Example 6*

100 cc. of a selenic acid ion exchanger are regenerated with 300 cc. of 6% HCl and washed. By treating the exchanger with a 3% NaCl solution until the exchanger is exhausted the amount of neutral salt decomposition is found to correspond to a capacity of 0.8–1% of CaO per 100 cc. of exchanger as found by the method disclosed in Example 4.

*Example 7*

100 cc. of a selenic acid ion exchanger are regenerated with 300 cc. of 6% HCl and washed.

The exchanger is thereafter treated with a solution of molybdenum in a mixture of 9 parts by volume of concentrated $H_2SO_4$ and 1 part by volume of concentrated $HNO_3$, preferably after previous dilution with water, the treatment being carried out until the exchanger is exhausted. The exchanger is washed free from acid and regenerated with a 10% $NH_4OH$ solution. The capacity with respect to molybdenum corresponds to a capacity of 1.9–2.1% of CaO per 100 cc. of exchanger as found by the method of Example 4.

*Example 8*

100 cc. of a selenic acid ion exchanger are regenerated with 300 cc. of 6% HCl, washed and treated with 10% $NH_4OH$. The treatment is carried out as in Example 7, and in this case also the molybdenum is selectively absorbed from the mineral acid solution. The exchanger is washed free from acid and regenerated with 10% $NH_4OH$ solution. The capacity with respect to molybdenum in this method corresponds to a capacity of 3–3.4% CaO per 100 cc. of exchanger as found by the method of Example 4.

What I claim is:

1. A process for the production of a cation exchange resin, which comprises reacting selenic acid at an elevated temperature with a cross-linked organic resin selected from the group consisting of (a) a cross-linked phenol-aldehyde resin, (b) a resinous reaction product of an aromatic hydrocarbon with an alkylene dichloride, and (c) copolymers of an aromatic compound containing several vinyl groups with an aromatic monovinyl compound.

2. A process as claimed in claim 1, wherein the reaction with the selenic acid is carried out in the presence of a selenate selected from the group consisting of copper selenate and silver selenate.

3. A process as claimed in claim 5, wherein the reaction with selenic acid is carried out in the presence of a selenate selected from the group consisting of copper selenate and silver selenate.

4. A process of cation exchange, wherein a cation containing liquid is brought into contact with a cation exchange resin obtained by the process of claim 1.

5. A process for the production of cation exchangers according to claim 1, wherein said cross-linked organic resin is a copolymer of a monovinyl aromatic compound and a polyvinyl aromatic compound.

6. A process according to claim 5, wherein the copolymer is a copolymer of styrene and divinyl benzene.

7. A cation exchange resin obtained by the process of claim 1.

8. A cation exchange resin obtained by the process of claim 5.

9. A cation exchange resin obtained by the process of claim 6.

References Cited in the file of this patent

UNITED STATES PATENTS 2,366,007  D'Alelio _____ Dec. 26, 1944

UNITED STATES PATENT OFFICE
CERTIFICATE OF CORRECTION

Patent No. 2,868,737                            January 13, 1959

Carl Boresch

It is hereby certified that error appears in the printed specification of the above numbered patent requiring correction and that the said Letters Patent should read as corrected below.

Column 1, line 58, for "copper selenides" read -- copper selenate --.

Signed and sealed this 9th day of June 1959.

(SEAL)
Attest:

KARL H. AXLINE
Attesting Officer

ROBERT C. WATSON
Commissioner of Patents